United States Patent [19]
Hirakawa et al.

[11] Patent Number: 5,618,167
[45] Date of Patent: Apr. 8, 1997

[54] VACUUM PUMP APPARATUS HAVING PELTIER ELEMENTS FOR COOLING THE MOTOR & BEARING HOUSING AND HEATING THE OUTER HOUSING

[75] Inventors: Yutaka Hirakawa, Kanagawa-ken; Shun-ichi Aiyoshizawa, Tokyo; Toshiharu Nakazawa, Kanagawa-ken, all of Japan

[73] Assignee: Ebara Corporation, Tokyo, Japan

[21] Appl. No.: 468,740

[22] Filed: Jun. 6, 1995

[30] Foreign Application Priority Data

Jul. 28, 1994 [JP] Japan .................................. 6-195874

[51] Int. Cl.⁶ .................................................. F04B 17/00
[52] U.S. Cl. .................. 417/372; 417/423.4; 417/423.8; 415/90; 415/178
[58] Field of Search .................................. 417/366, 372, 417/423.4, 423.8; 415/90, 178

[56] References Cited

U.S. PATENT DOCUMENTS

| | | | |
|---|---|---|---|
| 3,761,197 | 9/1973 | Kelly | 415/159 |
| 4,744,220 | 5/1988 | Kerner et al. | 62/3 |
| 4,929,151 | 5/1990 | Long et al. | 415/177 |
| 5,180,293 | 1/1993 | Hartl | 417/366 |
| 5,315,830 | 5/1994 | Doke et al. | 62/3.2 |
| 5,350,275 | 9/1994 | Ishimaru | 417/423.8 |
| 5,423,479 | 6/1995 | Nichols | 236/49.3 |
| 5,465,581 | 11/1995 | Haertl et al. | 62/50.1 |

FOREIGN PATENT DOCUMENTS

| | | |
|---|---|---|
| 352688 | 1/1996 | European Pat. Off. . |
| 2757599 | 6/1979 | Germany . |
| 212395 | 12/1982 | Japan .................................. 415/90 |
| 58-131430 | 8/1983 | Japan . |
| 63-140121 | 6/1988 | Japan . |
| 10-89933 | 4/1989 | Japan . |
| 60-78505 | 3/1994 | Japan . |
| 881372 | 11/1981 | U.S.S.R. .................................. 415/90 |
| PCT/EP93/01368 | 6/1993 | WIPO . |

*Primary Examiner*—Timothy Thorpe
*Assistant Examiner*—Ted Kim
*Attorney, Agent, or Firm*—Armstrong, Westerman, Hattori, McLeland & Naughton

[57] ABSTRACT

A vacuum pumping apparatus is presented having a Peltier element based device to provide a dual role of cooling for bearings/drive-motor and heating for sections prone to depositing reaction products. A housing (7) having the bearing and motor sections is provided with a Peltier element based device (20) to absorb the waste heat generated in the bearings and the drive motor, and transfer the waste heat to another section (17) of the apparatus to be released. The released heat may be used to heat that section of the device to facilitate vacuum processing, wherein reaction products are prone to sublime and deposit.

8 Claims, 7 Drawing Sheets

VACUUM PUMP APPARATUS HAVING PELTIER ELEMENTS FOR COOLING THE MOTOR & BEARING HOUSING AND HEATING THE OUTER HOUSING

BACKGROUND OF THE INVENTION

1. Field of the Invention

The present invention relates in general to vacuum pumps, such as turbo-molecular pumps, and relates in particular to a vacuum pumping apparatus which does not require cooling water for cooling the bearing and motor sections of the apparatus, and effectively prevents or reduces accumulation of reaction products.

2. Technical Background

FIG. 7 shows a cross sectional view of a turbo-molecular pump as an example of the conventional vacuum pump. The turbo-molecular pump is an axial flow pump and comprises a multi-stage assembly of moving vanes 4 rotating at high speed surrounded by stator vanes 4A. Gas molecules entering the pump through an inlet opening 1 strike and reflect off the surfaces of the moving vanes and stator vanes, producing a directed stream of exhaust molecules. Although this type of pump is capable of producing ultra-high vacuum, it is necessary to rotate the impeller (rotation body) 3 at a high speed of several tens of thousand revolutions per minute; and therefore, the supporting bearings must be non-lubricated magnetic bearings for ease of maintenance and prevention of gas generation.

As shown in FIG. 7 more specifically, the main shaft 2 having an impeller 3 fixedly attached thereto is supported in the radial direction by an upper radial bearing 9 and a lower radial bearing 11; and is supported in the axial direction by an upper axial bearing 12 and a lower axial bearing 13. These bearing components comprise coil 9A, 11A, 12A and 13A wound on respective yokes, and when supplied with electric current, interact magnetically with the opposing magnetic poles (not shown) of the main shaft 2. The driving motor 10 for driving the main shaft 2 to rotate at high speed comprises an induction or synchronous motor having coils 10A wound on a yoke. The driving motor 10 is supplied with an alternating current of relatively high frequency from a power source (not shown) which generates rotating spatial magnetic fields to rotate the magnetic poles of the main shaft 2. The static component comprises a driving motor section and the bearing component sections including of magnetic yokes and coils wound thereon, where the coils 10A, and the like, are coated with a resin 6, such as an epoxy resin, to protect the coils and prevent gas discharge. Connector 14 is provided to supply electrical power to the magnetic bearings 9, 11, 12 and 13 and the motor section 10.

The turbo-molecular pump presented above consumes a fairly large amount of operating power to drive the main shaft 2 at a high speed and to operate the magnetic bearings. For this reason, depending on the gas loading on the pump and operating temperatures, the coils can become overheated, and unless a cooling facility is provided, the epoxy coating 6 on the motor section and the magnetic bearings tend to degrade with use and ultimately lead to a breakdown of the electrical insulation of the coils. The cooling facility is provided by a housing 7' and cooling pipes 15 for circulating cooling water around the motor section and the magnetic bearings, as shown in FIG. 7. However, it is cumbersome to operate such a cooling facility because of the necessity for securing cooling water and controlling its flow rate, and the cooling problem can be further aggravated by such operating problems as corrosion of the pipes, leaking of cooling water and blockage in the pipes. Therefore, the conventional pumping apparatus is unsatisfactory from the viewpoints of utility and reliability.

Further operating problems in the conventional pump can arise from the fact that, when the exhaust gas is being routed from the inlet opening 1 to the outlet opening 16, because the exhaust gas from the pump sometimes contains reaction products, some reaction products can sublime and deposit on the stator side surfaces A, B. As the process of deposition continues, the deposits accumulating on the impeller 3 lead to operational problems such as narrowing, or even closure, of the gas passage, or back streaming of the reaction products towards the inlet opening 1.

FIG. 8 shows the subliming behavior chart of one typical example of such reaction products, $AlCl_3$. The x-axis represents temperature in celsius and the y-axis represents the vapor pressure in torr. It shows that $AlCl_3$ is solid above the sublimation line while it is vapor below the line.

Vacuum exhaust gas containing $AlCl_3$ entering the inlet opening 1 of the turbo-molecular pump is compressed between the turbine blades 4 of the impeller 3 and the screw groove 5 to be exhausted from the outlet opening 16. The exhaust gas increases its internal pressure as it approaches the outlet opening 16, often reaching a pressure between 0.01 to 3 torr, depending on the operating condition of the turbo-molecular pump. In this case, it can be seen from FIG. 8 that, at temperatures near room temperature, reaction products, which were originally in the vapor phase, can precipitate out as solid phase products. In practice, deposition occurs on the inner surface A of the spacer 8, the bottom surface B of the housing 7' and in the vicinity of the gas passage C. To prevent the occurrence of such deposition, it is necessary to increase the vapor pressure of the reaction products by increasing the temperature in the depositing regions, but in conventional pumps, these regions are cooled, in reality, by the cooling pipe 15 provided for cooling of the magnetic bearing sections and motor section.

As an approach to preventing deposition of reaction products, it is conceivable to dispose an external heater 24 on the housing 7' as shown in FIG. 9. In this case, because of the effect of the cooling water flowing through the cooling pipe 15, it is necessary to expend considerable amount of electrical power to heat the reaction products to the temperatures required to induce their sublimation. There is also a concern that the heater 24 may raise the temperature in the magnetic bearing sections and the motor section, thus leading to an overall assessment that this approach is not effective from the viewpoints of energy saving and reliability.

SUMMARY OF THE INVENTION

The objective of the present invention is to present a vacuum pumping apparatus having a device which performs a dual role of cooling means for cooling the bearing and motor sections, as well as heating means for heating those regions in the vicinity of the exhaust opening where reaction products are prone to accumulate.

The above objective is accomplished in a vacuum pumping apparatus comprising Peltier element means for regulating heat transfer within the apparatus, wherein a housing having bearing sections and a motor section is comprised of Peltier element means for directing waste heat generated in bearing sections and a motor section to other sections of the apparatus so that a heat transfer effect generated by the Peltier element means provides cooling to the bearings and the motor section.

An aspect of the apparatus is that the waste heat is transferred to a waste heat absorbing section of the pumping apparatus, where a process material in the form of gas is in contact internally with the pumping apparatus.

Still another aspect of the apparatus is that the pumping apparatus is further provided with a temperature sensor in the waste heat absorbing section so as to monitor temperature and maintain a specific temperature in the waste heat absorbing section.

Still another aspect of the apparatus is that the Peltier element means transfers the waste heat to a vicinity of an outlet opening having a high exhaust pressure.

The present invention is embodied also in a vacuum pumping apparatus comprising an inner housing having magnetic bearing sections and a motor section for non-contactingly supporting and driving an inner rotor provided with a fixed impeller disposed on an outer periphery of the inner housing; an outer housing surrounding the inner housing; and an exhaust gas passage formed between the impeller and outer housing; wherein a thermal insulation member including a Peltier element means for regulating heat transfer within the apparatus is provided between the inner housing and the outer housing.

An aspect of the embodiment presented above is that the thermal insulation member is sub-divided axially and each of sub-divided zones is provided with at least one Peltier element means, and a temperature in each sub-divided zone is controlled independently.

Another aspect of the embodiment is that the thermal insulation member is sub-divided radially and each of sub-divided zones is provided with at least one Peltier element means, and a temperature in each sub-divided zone is controlled independently.

The present invention also presents a method for regulating heat transfer processes in a vacuum pumping apparatus having an impeller shaft supported by magnetic bearings and driven by a motor, comprising the steps of providing a Peltier element means between a heat generation source and a heat sink source and directing waste heat generated in the magnetic bearings and the motor to a selected location of the apparatus with the use of the Peltier element means.

An aspect of the method presented is that the waste heat is transferred to a location in a vicinity of an outlet opening disposed in an exhaust gas passage.

The operational benefits accruing from the various aspects of the present invention presented above can be summarized as follows.

The apparatus enables the direction of heat transfer processes with the use of Peltier element device. This is demonstrated by disposing the Peltier element device on the inner housing which houses the bearing sections and the motor, and directing the waste heat generated in the bearing and motor sections to another section of the apparatus, by utilizing the heat pump-like effect of the Peltier element device. That is, waste heat removal cools the bearing and motor sections while the transferred heat is utilized to heat another section of the apparatus where reaction products are prone to accumulate. By providing heat to the section, the vapor pressures of the reaction products are increased to maintain the reaction products in the vapor phase, thus preventing accumulation of the reaction products within the gas passage. According to the apparatus, cooling can be provided where it is needed without using water and associated piping circuits, and heating can be provided where it is needed without using a heater and other associated equipment.

The provision of a temperature sensor in the heating section of the apparatus enables optimization of the temperature of the section where heating is required to prevent the accumulation of reaction products.

Positioning the insulation member including the Peltier element device between the inner and outer housing permits effective heat transfer of the waste heat from the inner housing to the outer housing. By sub-dividing the insulation member into radially and/or axially separated sub-zones, a heat transfer process can be tuned to the thermal needs of the various sections of the vacuum pumping apparatus.

PREFERRED EMBODIMENTS

Figure 1:
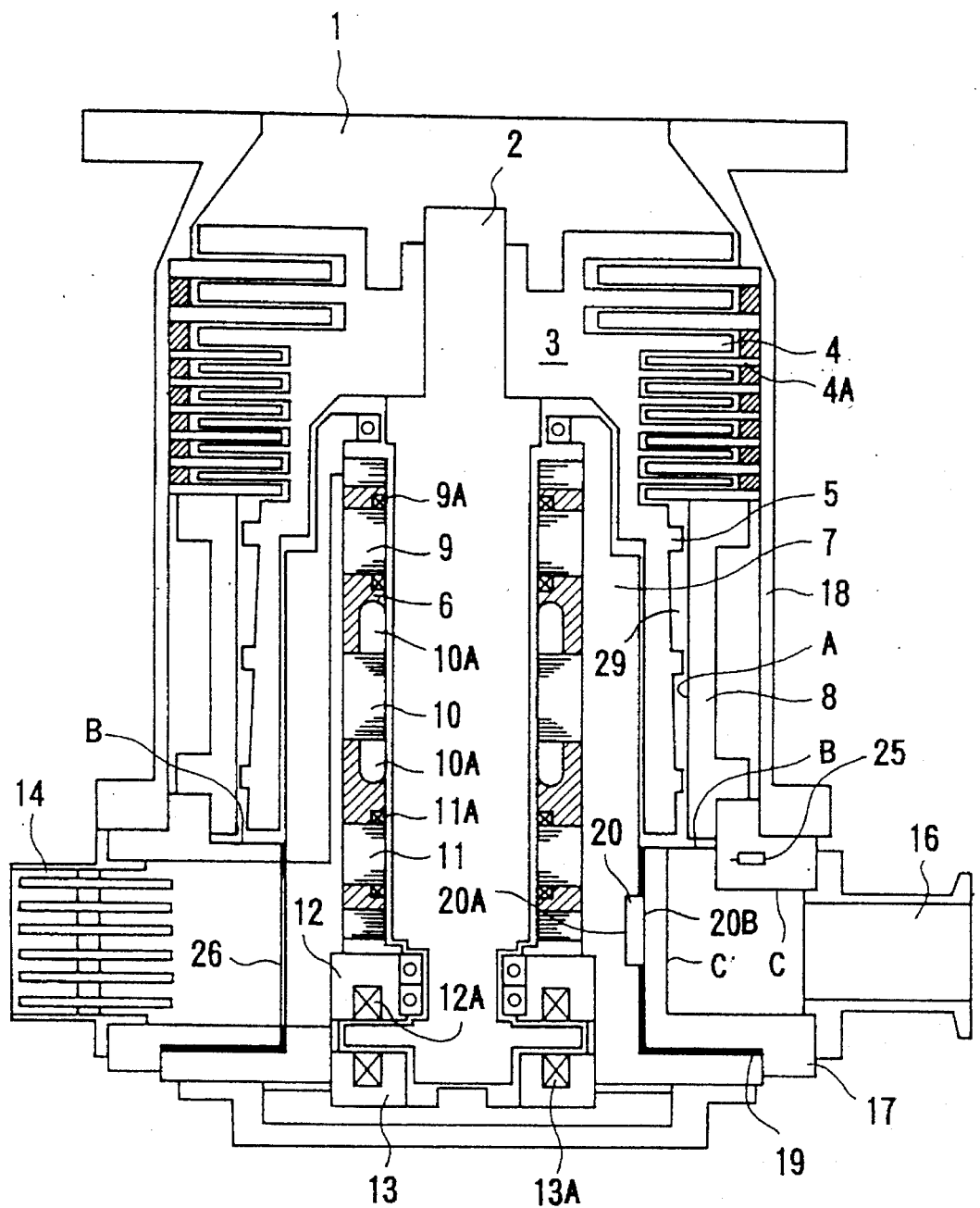
FIG. 1 is a cross sectional view of an embodiment of the turbo-molecular pumping apparatus of the present invention.

Preferred embodiments will be presented with reference to FIGS. 1 to 6. In each of the drawings, those parts which are common or equivalents are designated by the same reference numerals.

Figure 7:
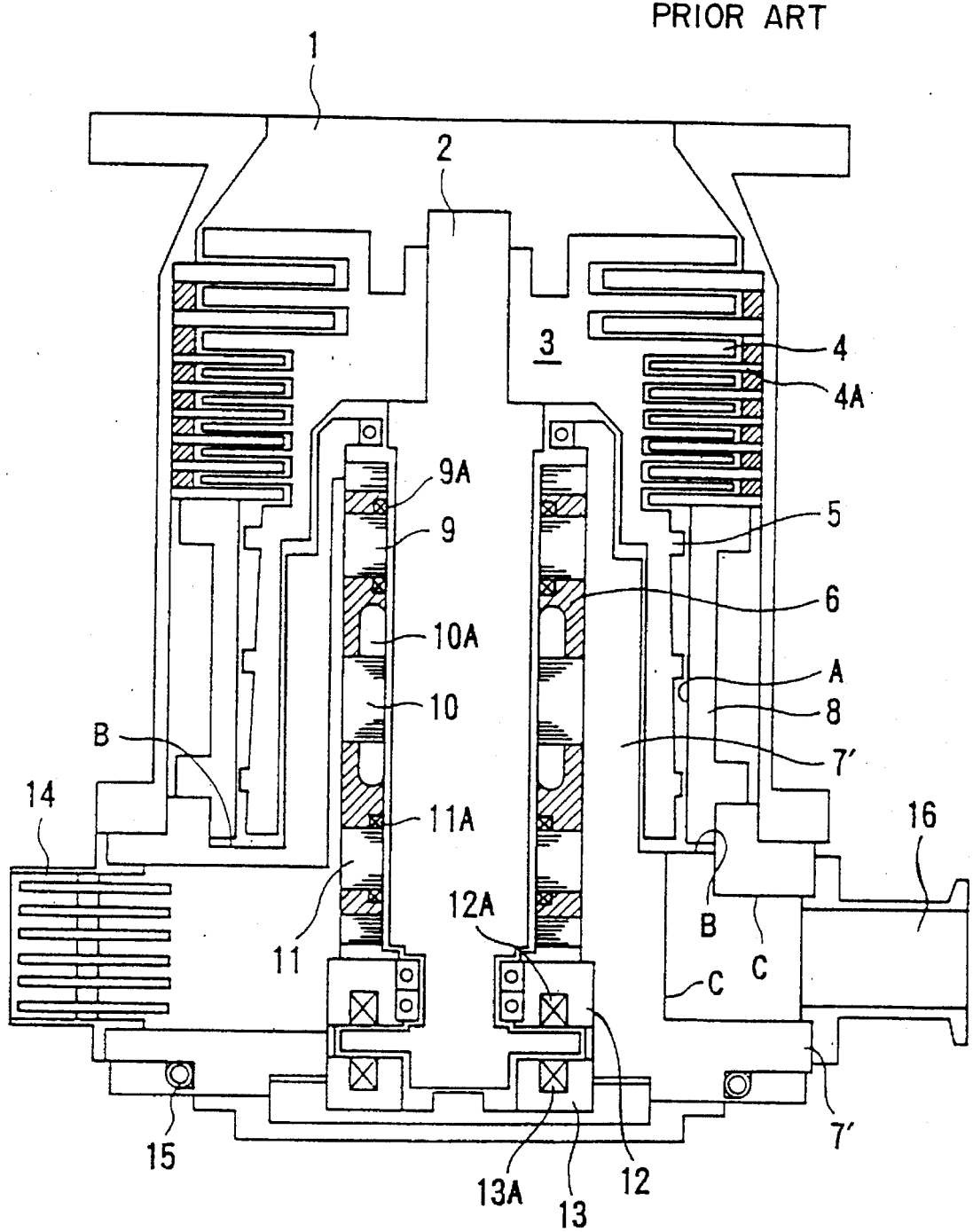
FIG. 7 is a cross sectional view of a conventional turbo-molecular pump.

The basic structure of the vacuum pumping apparatus is the same as the turbo-molecular vacuum pump shown in FIG. 7. The turbo-type vacuum pumping apparatus comprises: an inner housing 7 having the magnetic bearing sections 9, 11, 12 and 13 and the motor section 10 for non-contactingly supporting and driving an inner rotor (main shaft) 2 having a fixed impeller (rotation body) 3 which is disposed on the outer periphery of the inner housing 7; an outer housing 17 housing the impeller 3; and a gas passage 29 formed in the space between the rotation body 3 and the outer housing 17 and the spacer 8.

The motor section 10, the radial magnetic bearings 9, 11 for radially supporting the inner rotor 2 (having a fixed rotation body 3) and the axial magnetic bearings 12, 13 for axially supporting the inner rotor 2 are attached to the inside surface of the inner housing 7. These magnetic bearing sections and the motor section provide the driving power for rotating the impeller 3 at high speed as well as support the impeller 3 non-contactingly with respect to the stator. These moving components of the vacuum pumping apparatus consume a fair amount of electrical power and act as a source of thermal energy.

The Peltier element 20 is disposed in a thermal insulation member 19 formed by the inner housing 7 and the outer housing 17. The inner housing 7 containing thermal generators are joined to the surrounding outer housing 17 through the thermal insulation member 19 including the Peltier element 20, while, in the vicinity of the Peltier element 20, the inner housing 7 is thermally insulated from the outer housing 17. The inner and outer housings 7 and 17 themselves are made of a metallic material of good thermal conductivity, such as aluminum alloys. The thermal insulation member 19 is made of a material of inferior thermal conductivity than the material comprising the inner and outer housings 7, 17, for example, stainless steels. Alternatively, an evacuated hollow member would serve as an insulation member, as would the Peltier element itself.

A lead opening 26 is provided on the connector 14 side of the insulation member 19 for taking out the lead wires for the motor section and the bearing sections. The electrical power is supplied through the connector 14 to the Peltier element 20, motor coil 10A, bearing coils 9A, 11A, 12A and 13A.

Figure 2:
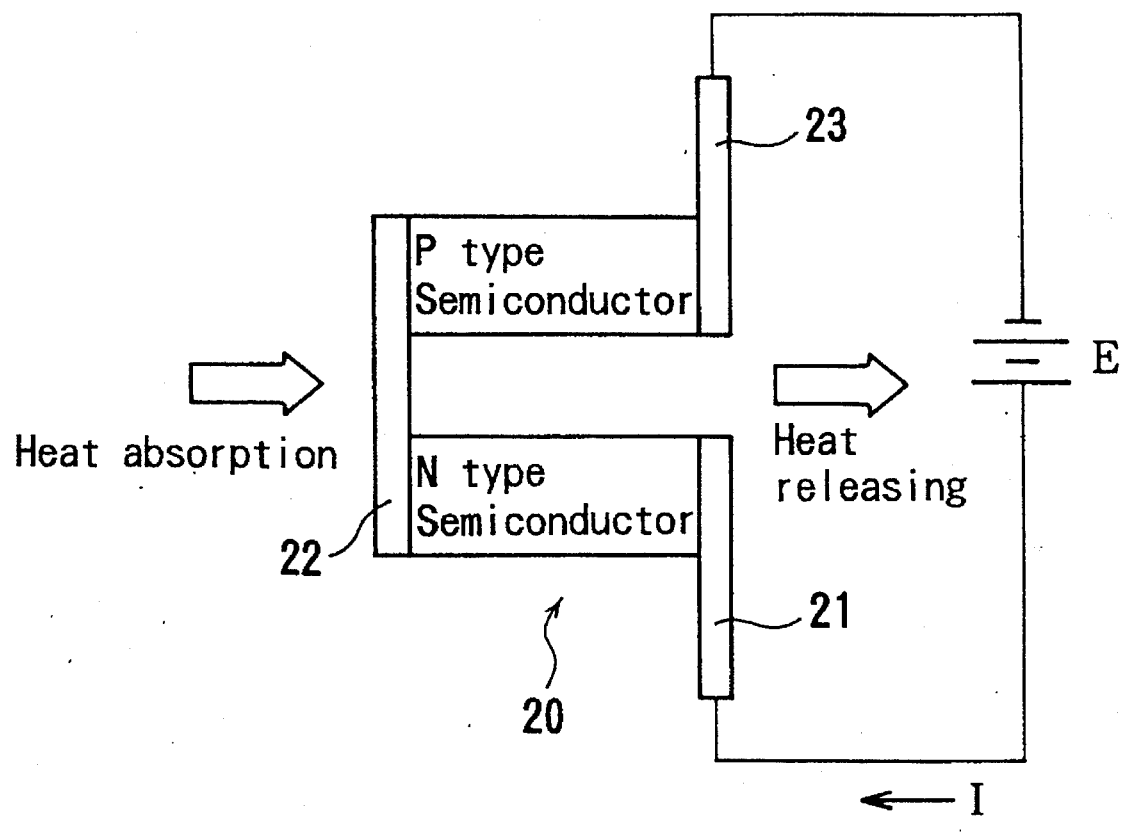
FIG. 2 is a schematic representation of the operation of the Peltier element device.

The Peltier element device functions as a heat pump, when a direct current is applied, as shown in FIG. 2, across two different types of electrical conductors or semiconductors joined together with an intervening metal member. More specifically, when a current I is supplied from a direct current source E in the direction of the arrow shown in FIG. 2, then heat transfer takes place from the metal plate 22 to the metal plates 21, 23. That is, heat is absorbed at the metal plate 22, and thermal flow occurs through the metal plates 21, 23. When the current flow direction is reversed, heat transfer occurs in the opposite direction.

The Peltier element 20 shown in FIG. 1 is operatively connected to power and control circuits so that the current supply to the element 20 can be regulated. The Peltier element 20 is disposed so that its heat absorbing surface 20A is in intimate contact with the outer surface of the inner housing 7, and its heat releasing surface 20B with the inner surface of the outer housing 17. It follows that by supplying current in the Peltier element 20 in a certain direction, the waste heat from the inner housing 7 is absorbed by the Peltier element 20, and is transferred, through the heat releasing surface 20B of the to the outer housing 17. In effect, the heat generated in the magnetic bearing sections 9, 11, 12 and 13 and the motor section 10 is conducted to the inner housing 7, and in turn conducted away from the inner housing 7 to the outer housing 17 by the heat pump-like action of the Peltier element 20.

Therefore, in the inner housing 7, the bearing sections 9, 11, 12 and 13 and the motor section 10 are cooled by the heat absorbing action while in the outer housing 17, the waste heat is conducted away from the inner housing 7 to provide heat to the spacer 8 and the outlet opening 16 which are in direct contact with the outer housing 17. When the outer housing 17 is heated, the temperatures of the deposition-prone regions A, B and C are increased where the reaction products tend to form deposits, and the saturation vapor pressures of the reaction products are raised. Therefore, even if the exhaust gas pressure increases at the regions A, B and C and near the outlet opening 16, the problem of sublimation and deposition of reaction products can be prevented or lessened.

Furthermore, in this embodiment, the outer housing 17 is provided with a temperature sensor 25 to enable monitoring the temperatures in the deposition-prone regions A, B and C. The temperature sensor 25 may be a thermocouple or thermistor, and is operatively connected to a controller (not shown). This allows regulation of the current supplied to the Peltier element 20 in accordance with the temperature detected by the temperature sensor 25, thereby enabling of control the temperatures in the deposition-prone regions A, B and C at optimum. It should be mentioned that because the space between the outer housing 17 and the inner housing 7 is thermally insulated by the thermal insulation member 19, the problem of reversing the thermal flow is minimizied.

Figure 8:
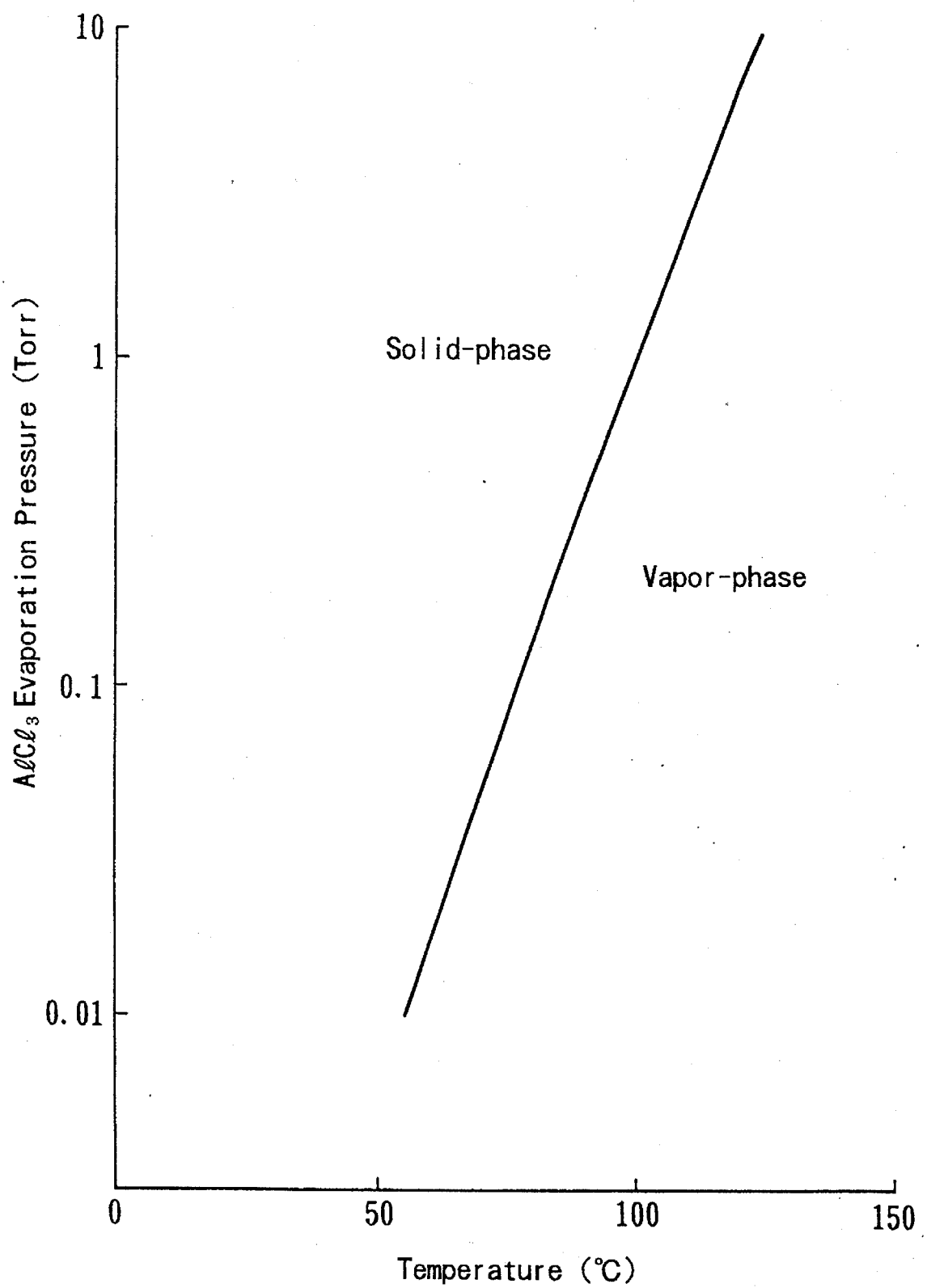
FIG. 8 is an example of sublimation diagram showing solid/vapor separation boundary of a reaction product.
Figure 9:
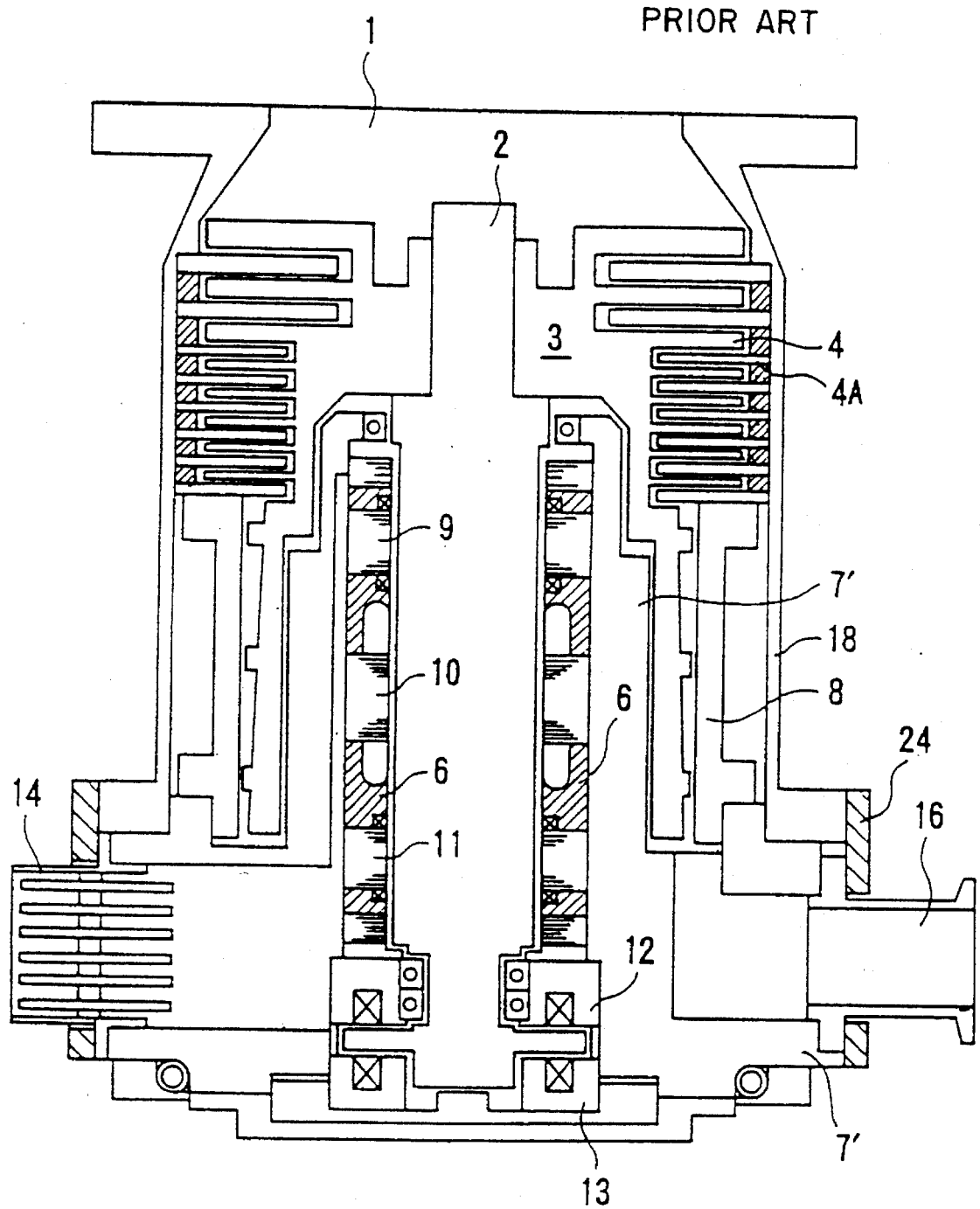
FIG. 9 is a cross sectional view of another example of the conventional turbo-molecular pump.

In the embodiment presented above, it is a prerequisite that the temperature of the deposition prone regions A, B and C be on the vapor phase side of the sublimation line shown in FIG. 8, and it is preferable that the temperature should be high. Similarly, the magnetic bearings and the motor section should be controlled so that their temperatures would not exceed 80° C. (Celsius). To control these temperatures, temperature sensors may be placed near the respective sources of thermal generation.

Figure 3:
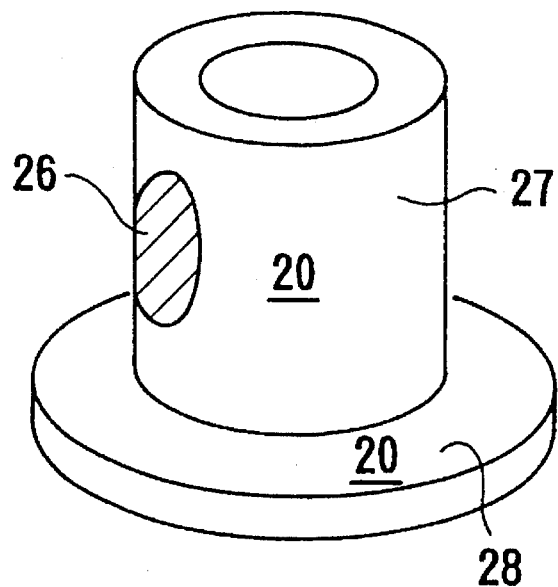
FIG. 3 is a schematic illustration of disposing the Peltier element devices on all the thermal control zones between the inner housing and the outer housing.

FIGS. 3 to 6 show various configurations of the thermal control zones (shortened to zones hereinbelow) comprising thermal insulation member 19 including the Peltier element 20. FIG. 3 shows a case of the entire zones 27, 28 being made up of Peltier elements. Here, the opening seen in FIG. 3 is a lead opening 26 for the lead wires to supply electrical current to the bearing sections and the motor section. The lead wires are operatively connected to a hermetic connector (not shown). It is not necessary to cover the entire area with the Peltier elements 20, but to provide, for example, about six equally spaced elements 20 on the cylindrical section 27 within the zone, leaving the remaining area fabricated as insulation member 19.

Figure 4:
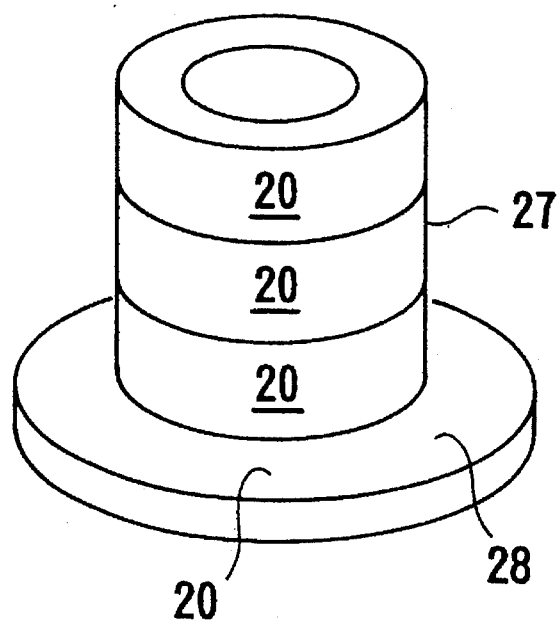
FIG. 4 is a schematic illustration of a case of disposing the Peltier element devices on axially separated thermal control zones between the inner and outer housing.

FIG. 4 shows a case of dividing the zones 27, 28 into sub-zones. In this embodiment also, the zone 27 can be made up of Peltier elements 20, and the zone 27 is divided into three axial sub-divisions. Each sub-divided zone can be independently controlled. Therefore, it is possible to control waste heat transfer in each axial zone of the three sub-divisions of zone 27 as well as in the zone 28. Rather than disposing elements 20 on the entire surface of each zone, it is also permissible to arrange the elements 20 to be distributed as islands in a matrix of insulation members 19.

Figure 5:
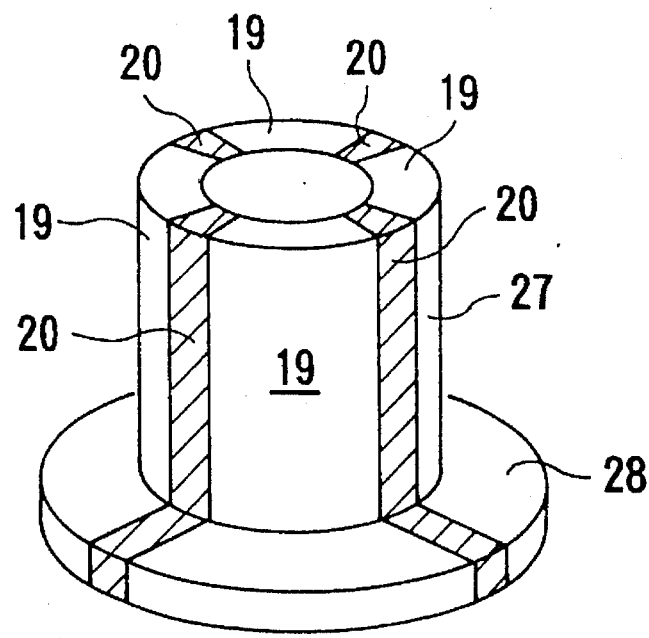
FIG. 5 is a schematic illustration of a case of disposing the Peltier element devices on radially separated thermal control zones between the inner and outer housing.
Figure 6:
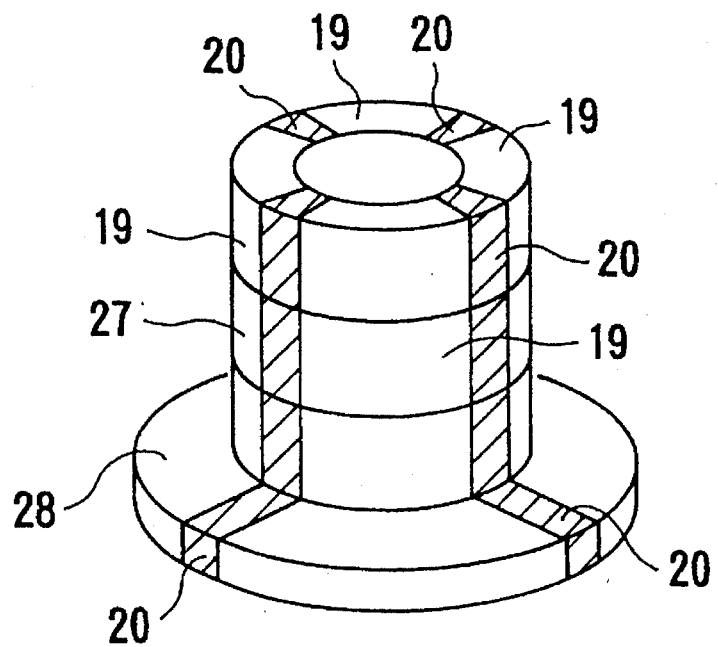
FIG. 6 is a schematic illustration of a case of disposing the Peltier element devices on axially separated thermal control zones as well as radially separated thermal control zones between the inner and outer housing.

FIG. 5 shows a case of dividing the zones 27, 28 into four radially separated sub-zones, and distributing the elements 20 as islands in a matrix of insulation members 19. It should be noted that all regions other than the elements 20 are made up of the insulation member 19. FIG. 6 shows a case of dividing furthermore the zones 27, 28 into three axially separated sub-zones. By configuring the Peltier elements in such subdivided zones, and controlling heat transfer independently in each sub-zones, it enables temperature control to be tuned for the thermal needs of the various sections of the vacuum pumping apparatus.

It should also be noted that although the above embodiments show a single layer structure of the Peltier element 20, it is permissible to provide double- or triple-layer structure of the Peltier element. By providing such a multi-layer structure for the Peltier elements in those regions of high heat generation, it becomes possible to cool such regions more effectively. When those regions which need heating are so far away from the Peltier element that effective heating cannot be provided, it is of course permissible to provide auxiliary methods, such as heaters, heat insulation materials and other means.

It should be noted that although the present invention has been illustrated using embodiments utilizing magnetic bearings, the pumping apparatus of the present invention is equally applicable to pumps of other types of vacuum pumps utilizing screw/groove pumping or one equipped with ball bearings. It is clear that other modifications of the thermal control zones utilizing Peltier effect to control heat transfer processes are possible without departing from the basic principle disclosed herein.

What is claimed is:

1. A vacuum pump apparatus comprising: an outer housing containing a fluid inlet opening and a fluid outlet opening spaced from said fluid inlet opening; an inner housing disposed within said outer housing and containing a rotor, bearing sections journalling said rotor for rotation, a motor section containing a motor for operating said rotor, and an impeller secured to said rotor for rotation therewith, said inner housing and said outer housing being mutually spaced between said fluid inlet opening and said fluid outlet opening to define a fluid flow path therebetween; and means forming a Peltier element containing a heat absorbing surface and a heat releasing surface operably positioned between said inner housing and said outer housing to transfer heat generated within said inner housing to said outer housing adjacent said fluid outlet opening.

2. A vacuum pump apparatus as claimed in claim 1 wherein said heat absorbing surface of said Peltier element is in intimate contact with said inner housing and said heat releasing surface is in intimate contact with said outer housing.

3. A vacuum pump apparatus as claimed in claim 1 wherein said impeller operates to increase the pressure of fluid conducted through said apparatus between said inlet opening and said outlet opening.

4. A vacuum pumping apparatus as claimed in claim 1 including means for adjusting the rate of operation of said Peltier element, and a temperature sensor operative to sense the temperature of fluid passing through said pump apparatus and to regulate the operation of said Peltier element in response thereto for maintaining a predetermined temperature in said pump apparatus.

5. A vacuum pumping apparatus according to claim 1 wherein said Peltier element forming means includes a plurality of Peltier elements disposed in various regions of said apparatus, and means for independently controlling the Peltier element in each respective region.

6. A vacuum pumping apparatus comprising an inner housing having magnetic bearing sections and a motor section for non-contactingly supporting and driving an inner rotor provided with a fixed impeller disposed on an outer periphery of said inner housing; an outer housing surrounding said inner housing; and an exhaust gas passage formed between said inner housing and outer housing; wherein a thermal insulation member including a Peltier element means for regulating heat transfer within said apparatus is provided between said inner housing and said outer housing.

7. A pumping apparatus as claimed in claim 5, wherein said thermal insulation member is sub-divided axially and each of sub-divided zones is provided with at least one Peltier element means, and a temperature in each sub-divided zone is controlled independently.

8. A pumping apparatus as claimed in claim 5, wherein said thermal insulation member is sub-divided radially and each of sub-divided zones is provided with at least one Peltier element means, and a temperature in each sub-divided zone is controlled independently.

* * * * *

UNITED STATES PATENT AND TRADEMARK OFFICE
CERTIFICATE OF CORRECTION

PATENT NO.:     5,618,167
DATED     :     April 8, 1997
INVENTOR(S):     Yutaka Hirakawa, Shun-ichi Aiyoshizawa, and Toshiharu Nakazawa It is certified that error appears in the above-identified patent and that said Letters Patent is hereby corrected as shown below:

At column 8, line 23, please delete "claim 5" and insert therefor --claim 6--.

At column 8, line 28, please delete "claim 5" and insert therefor --claim 6--.

Signed and Sealed this

First Day of July, 1997

*Attest:*

BRUCE LEHMAN

*Attesting Officer*     *Commissioner of Patents and Trademarks*